United States Patent
Wiekmeijer

(10) Patent No.: US 6,595,170 B2
(45) Date of Patent: Jul. 22, 2003

(54) HYDRAULIC VALVE-OPERATING MECHANISM

(75) Inventor: Theodorus Wiekmeijer, Doetinchem (NL)

(73) Assignee: Prometheus Engineering B.V., Doetinchem (NL)

( * ) Notice: Subject to any disclaimer, the term of this patent is extended or adjusted under 35 U.S.C. 154(b) by 0 days.

(21) Appl. No.: 10/164,417

(22) Filed: Jun. 10, 2002

(65) Prior Publication Data

US 2002/0148421 A1 Oct. 17, 2002

Related U.S. Application Data

(63) Continuation of application No. PCT/NL00/00851, filed on Nov. 21, 2000.

(30) Foreign Application Priority Data

Dec. 9, 1999 (NL) .............................................. 1013811

(51) Int. Cl.[7] ................................................. F01L 9/02
(52) U.S. Cl. ................................ 123/90.12; 123/90.16; 123/90.17; 123/90.22; 123/90.26; 123/90.27; 123/90.31; 123/90.6
(58) Field of Search ........................... 123/90.12, 90.22, 123/90.26, 90.27, 90.31, 90.33, 90.34, 90.6, 90.15, 90.16, 90.17, 90.18

(56) References Cited

U.S. PATENT DOCUMENTS

| | | | | |
|---|---|---|---|---|
| 4,244,553 A | * | 1/1981 | Escobosa | 123/90.12 |
| 5,255,641 A | * | 10/1993 | Schechter | 123/90.11 |
| 5,537,976 A | * | 7/1996 | Hu | 123/322 |
| 6,012,424 A | * | 1/2000 | Meistrick | 123/321 |
| 6,267,098 B1 | * | 7/2001 | Vanderpoel | 123/321 |

FOREIGN PATENT DOCUMENTS

| | | | |
|---|---|---|---|
| DE | 35 20 215 A | 9/1986 | |
| DE | 199 31 129 A | 1/2000 | |
| EP | 0 027 949 A | 5/1981 | |
| EP | 0 945 606 A | 9/1999 | |
| FR | 2 480 854 | 10/1981 | |
| GB | 2300226 A | * 10/1996 | F02B/21/00 |
| NL | 46 277 C | 7/1939 | |

* cited by examiner

Primary Examiner—Thomas Denion
Assistant Examiner—Ching Chang
(74) Attorney, Agent, or Firm—Browdy and Neimark, P.L.L.C.

(57) ABSTRACT

A mechanism for operating one or more valves of a piston device, in particular an intake or exhaust valve of an internal-combustion engine, which valve can move between an open position and a closed position and is provided with associated restoring means for returning the valve to the closed position.

The mechanism comprises a hydraulic valve actuator for operating the valve of the piston device, which valve actuator has a variable chamber which is delimited by a piston which can be coupled to the valve, in such a manner that when hydraulic fluid is supplied to the said chamber the valve opens. Furthermore, there are rotatable first and second cams, each having an associated cam follower, the relative angular position of the first cam and the second cam with respect to one another being adjustable.

The mechanism also comprises a pressure actuator in which there is a pressure chamber having a variable volume and having a first and a second plunger, the first cam follower being coupled to the first plunger and the second cam follower being coupled to the second plunger, and retraction of one plunger leading to a reduction in the volume of the pressure chamber.

The pressure chamber of the pressure actuator is connected to the variable chamber of the valve actuator to form a common chamber.

The common chamber is provided with an opening, which opening has an associated valve assembly for opening and closing the opening. In the open position, the hydraulic pressure is insufficient to open or hold open the valve.

The mechanism is designed in such a manner that, at the moment at which the first plunger begins to move out of the extended position into the retracted position, the second plunger is in its retracted position or has almost reached its retracted position, in such a manner that the valve which is operated by the valve actuator opens as a result of the retracting movement of the first plunger.

17 Claims, 10 Drawing Sheets

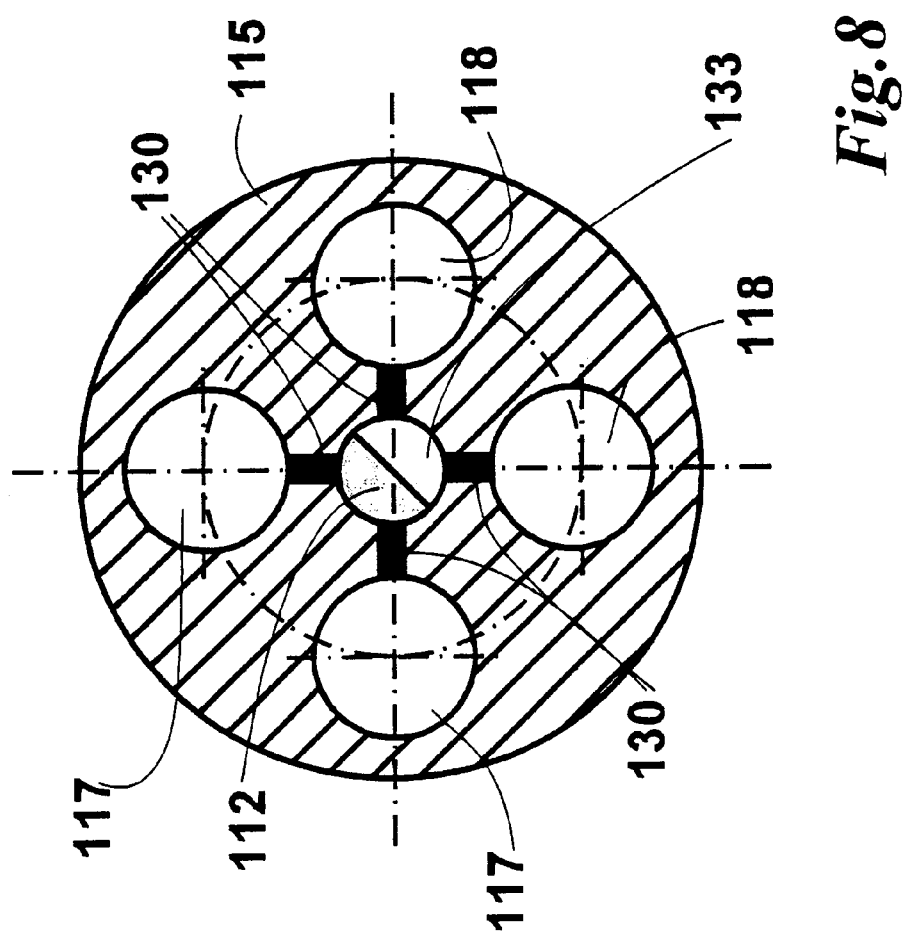

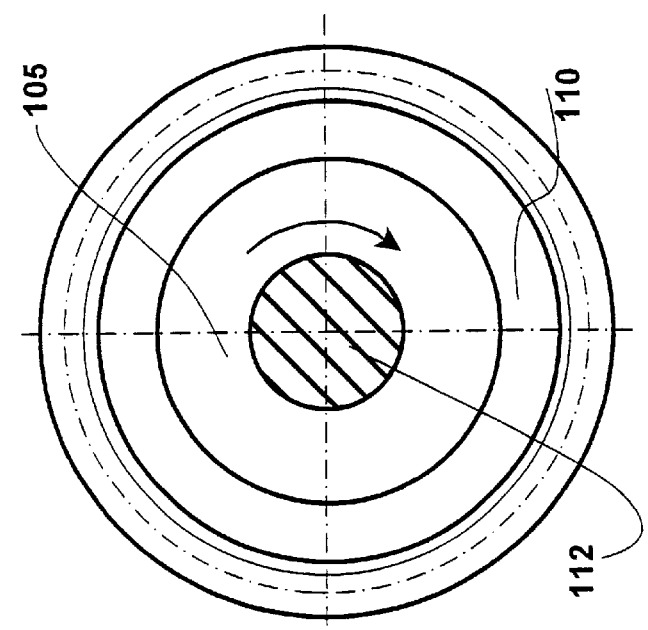
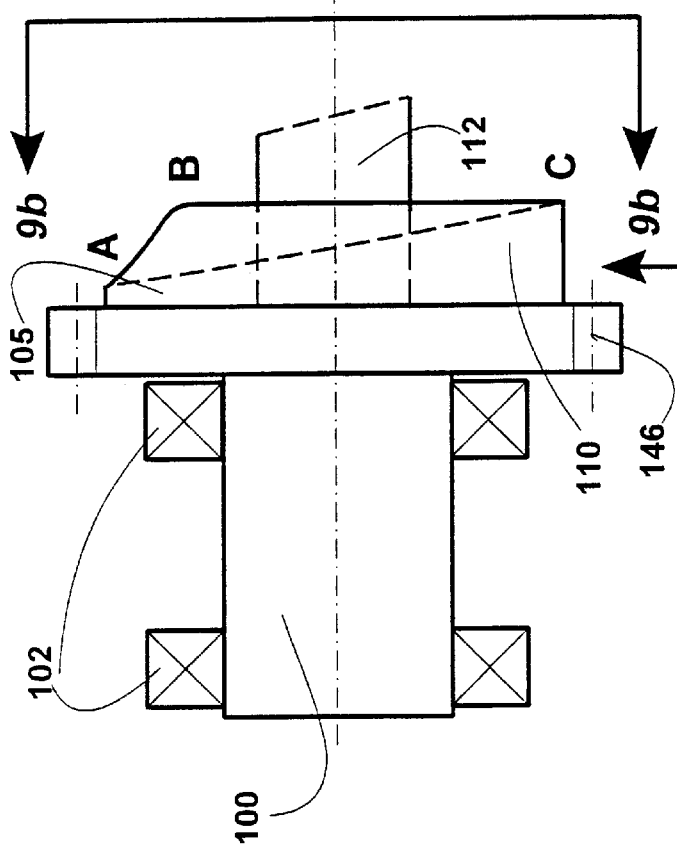
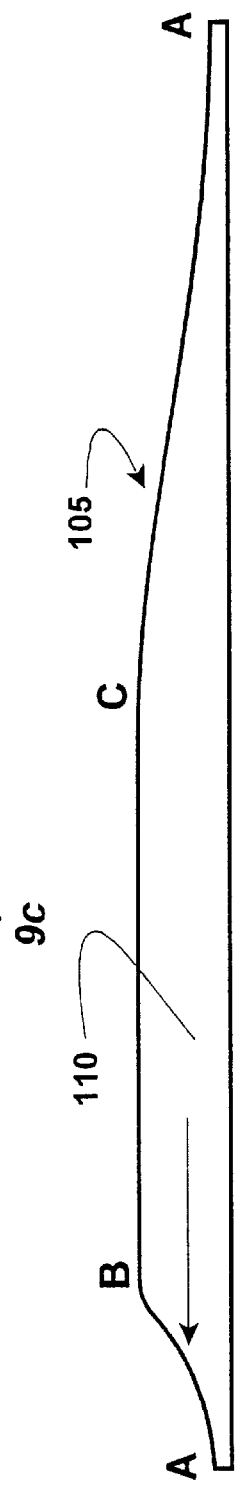
*Fig.9a*
*Fig.9b*
*Fig.9c*

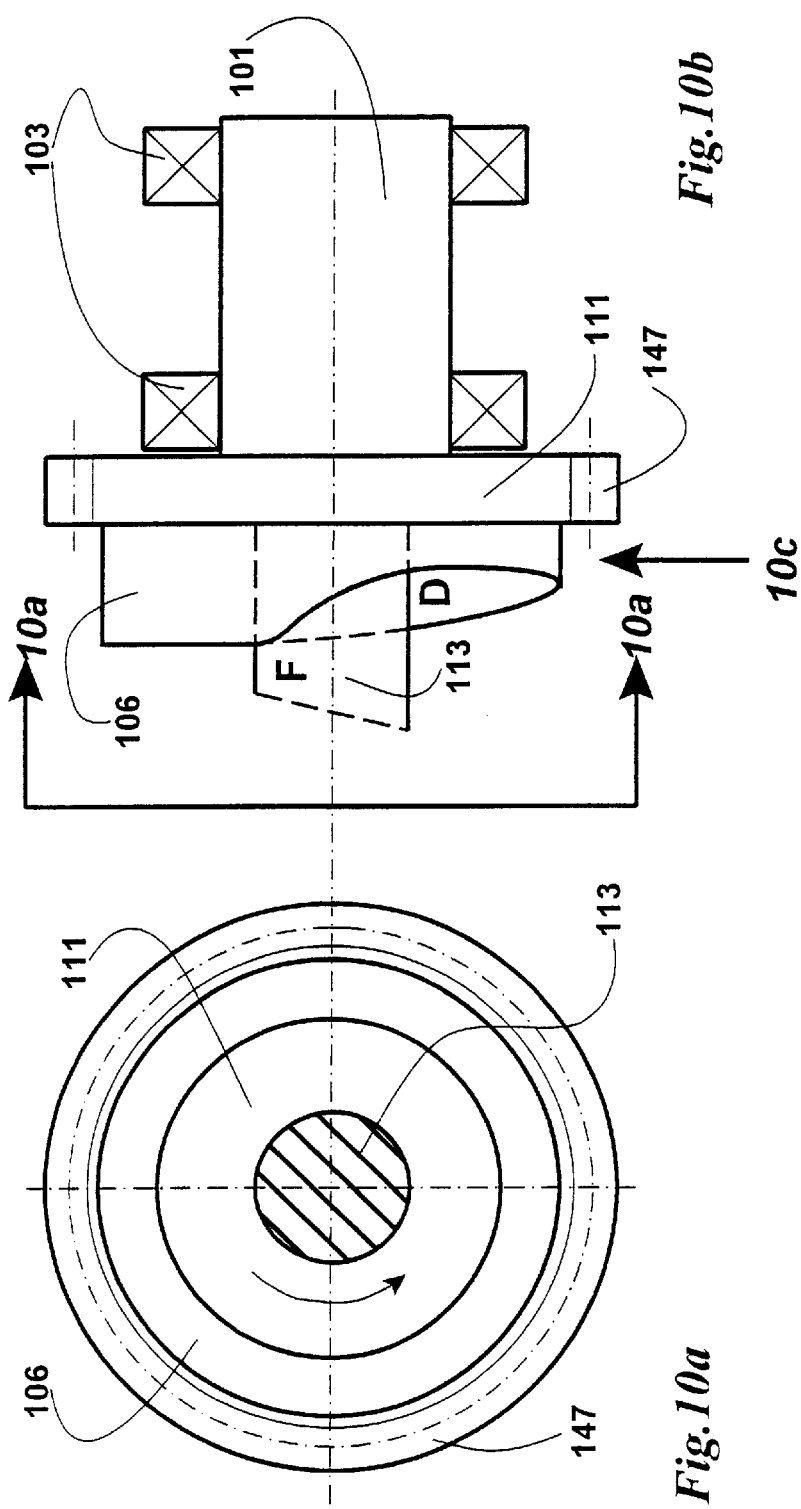
*Fig.10a*  *Fig.10b*  *Fig.10c*

HYDRAULIC VALVE-OPERATING MECHANISM

CROSS-REFERENCE TO RELATED APPLICATION

This is a continuation of copending parent International application Serial No PCT/NL00/00851, filed Nov. 21, 2000.

FIELD OF THE INVENTION

The invention relates to a mechanism for operating one or more valves of a piston device, in particular an intake valve and/or an exhaust valve of an internal-combustion engine.

BACKGROUND OF THE INVENTION

A valve-operating mechanism is known from FR 2 480 854. This known mechanism comprises a first plunger and a second plunger, each plunjer being operated by a corresponding cam. These cam operated plungers and the piston for actuating the valve delimit a common chamber which is filled with hydraulic fluid. The common chamber of the known mechanism is provided with a check valve controlled opening. Via this opening hydraulic fluid can be supplied to the common chamber to compensate for play in the valve-operating mechanism.

The invention relates in particular to a mechanism which makes it possible to make opening and closing the valve(s) variable to a considerable extent, in a particular embodiment as a function of the demand for torque in an internal-combustion engine.

OBJECT OF THE INVENTION

The object of the invention, in a particular embodiment, is to provide a valve-operating mechanism which makes it possible to operate an internal-combustion engine using the so-called Miller cycle. At the end of the 1940s, Miller proposed that an internal-combustion engine working on the spark-ignition principle be provided with a system in which, without using a so-called compound cylinder, the compression ratio and expansion ratio are significantly different from one another. Miller achieved this by providing the intake valve of a 4-stroke engine with a very large after-closure.

One drawback of the Miller cycle is that the specific output of the engine falls considerably if the engine has fixed opening times for the intake and exhaust valves. The invention aims to make it possible on the one hand to fully utilise the advantages of the Miller cycle under partial load yet, when full power is required, to completely or partially switch off the Miller cycle.

SUMMARY OF THE INVENTION

The present invention provides a mechanism for operating a valve of a piston device, in particular an intake or exhaust valve of an internal-combustion engine, which valve can move between an open position and a closed position and is provided with associated restoring means for returning the valve to the closed position.

The mechanism comprises:
a hydraulic valve actuator for operating the valve of the piston device, which valve actuator has a variable chamber which is delimited by a piston which can be coupled to the valve, in such a manner that when hydraulic fluid is supplied to the said chamber the valve opens,
a rotatable first cam with a first cam profile,
a rotatable second cam with a second cam profile,
the first cam profile and the second cam profile each comprising
a rising flank, a stationary flank and a falling flank,
a first cam follower which can be operated by the first cam,
a second cam follower which can be operated by the second cam,
the relative angular position of the first cam and the second cam with respect to one another being adjustable,
a pressure actuator in which there is a pressure chamber having a variable volume and having a first and a second plunger, the first cam follower being coupled to the first plunger and the second cam follower being coupled to the second plunger, in such a manner that a plunger is stationary if the associated cam follower is operated by the stationary flank, the first and second plungers each being displaceable between a retracted position and an extended position, in such a manner that the position of the first and second plungers defines the volume of the pressure chamber, the retraction of a plunger leading to a reduction in the volume of the pressure chamber,
the pressure chamber of the pressure actuator being connected to the variable chamber of the valve actuator to form a common chamber,
the common chamber being provided with a common chamber opening which common chamber opening has an associated valve assembly for opening and closing the common chamber opening.

The valve assembly associated with the common chamber opening is adapted to open said common chamber opening if the first plunger moves to the extended position or if the second plunger moves to the retracted position, so that hydraulic fluid can flow out of the common chamber.

If the common chamber opening is open the hydraulic pressure in the common chamber is insufficient to open or hold open the valve operated by the hydraulic valve actuator.

The mechanism is designed in such a manner that, at the moment at which the first plunger begins to move out of the extended position into the retracted position, the second plunger is in its retracted position or has almost reached its retracted position, in such a manner that the valve which is operated by the valve actuator opens as a result of the retracting movement of the first plunger.

The adjustability of the angular position of the cams with respect to one another allows virtual cam profiles which differ within a wide range to be obtained. For example, the present mechanism makes it possible, in a 2-stroke internal-combustion engine, to set the valve angle of the intake valve in a continuously variable manner between approximately 100 and 180 degrees while retaining the maximum valve lift. In a 4-stroke engine, the valve angle of the inlet valve can be set between 180 and 360 degrees. In many known mechanisms, there is a relationship between the valve angle and the valve lift, the valve lift generally increasing when the valve angle increases. A relationship between valve angle and valve lift of this type represents a disadvantage.

In the mechanism according to the invention, the first and second cam profiles may be different.

In a piston device with a crankshaft, the angle between the cams may be adjusted, for example, as a result of one of the cams having an angular position which can be adjusted with respect to the crankshaft. It is also possible for both cams to be adjustable independently of one another in terms of their angular position with respect to the crankshaft.

The mechanism according to the invention is particularly advantageous for operating the intake valve of a 4-stroke internal-combustion engine, in particular because the after-closure of the intake valve can be varied easily, so that the traction characteristic of the engine can be optimized. To make this possible, it is advantageous if the angular position of the second cam with respect to the crankshaft of the engine can be adjusted within a considerable range. As a result, it is possible to set a large after-closure at a high engine speed and a smaller after-closure at a low speed. The time at which the intake valve opens can then be varied by also making the angular position of the first cam, variably adjustable within a smaller range.

In 2-stroke internal-combustion engines provided with uniflow scavenging with an exhaust controlled by valves, the mechanism according to the invention also has advantages. Firstly, the pre-exhaust with respect to the point at which the scavenging ports open can now be selected as a function of load and/or speed, since fewer crank degrees are required for pressure equalization at a low speed, but also a lower scavenging factor may be sufficient under a low load, so that the exhaust valves can close earlier, and so that, in 2-stroke engines with pressure charging, the exhaust temperature remains higher, which is advantageous in order to keep the engine operating without an emergency scavenging pump.

In an embodiment which is advantageous in practice, each cam follower is integral with the associated plunger, but in a variant, it is also possible to provide a suitable transmission mechanism between a cam follower and the associated plunger.

The present invention provides for the opening and closing of the valve of the piston device to be completely determined by a hydrostatic process. In this case, the question of whether the opening of the common chamber is open or closed is the determining factor for whether the pressure in the said common chamber can reach a level which is sufficient to open and hold open the valve of the piston device.

Preferably, the valve of the piston device is closed not by means of hydraulic fluid flowing out of the common chamber, but rather entirely on the basis of the movement of the second plunger. As a result, it is possible to ensure that the speed at which the valve moves onto its seat is virtually equal to zero, so that damage to the valve and/or seat and possibly breaking of the valve stem are prevented.

Another possible application is the operation of suction and/or pressure valves of a piston compressor. In this way, it is possible to achieve continuously variable control of the capacity of the compressor from 0–100%. Known compressors can generally only be controlled within 50 to 100% of their capacity, since they are unstable at a lower range of 0–50% of the stroke volume.

A further advantage of the mechanism according to the invention is that it is possible to operate a piston compressor at a higher speed, since the mechanism then also makes it possible to achieve a closing speed of the valves which is equal to zero. Furthermore, the valves lift can be selected to be greater than in known compressors, so that the valve losses are lower. In known compressors, the valve losses may amount to 25% of the isentropically absorbed power. It is also possible for the clearance volume to be small, which is of benefit to the principal dimensions of the compressor.

The invention will be explained in more detail below with reference to the drawing.

BRIEF DESCRIPTION OF THE DRAWINGS

FIG. 8 shows a cross-section on line VIII—VIII in FIG. 7, FIGS. 9a–c respectively show a side view, a front view and a developed illustration of the left-hand cam from FIG. 7, and FIGS. 10a–c respectively show a side view, a front view and a developed illustration of the right-hand cam from FIG. 7.

DETAILED DESCRIPTION OF THE DRAWINGS

Figure 1:
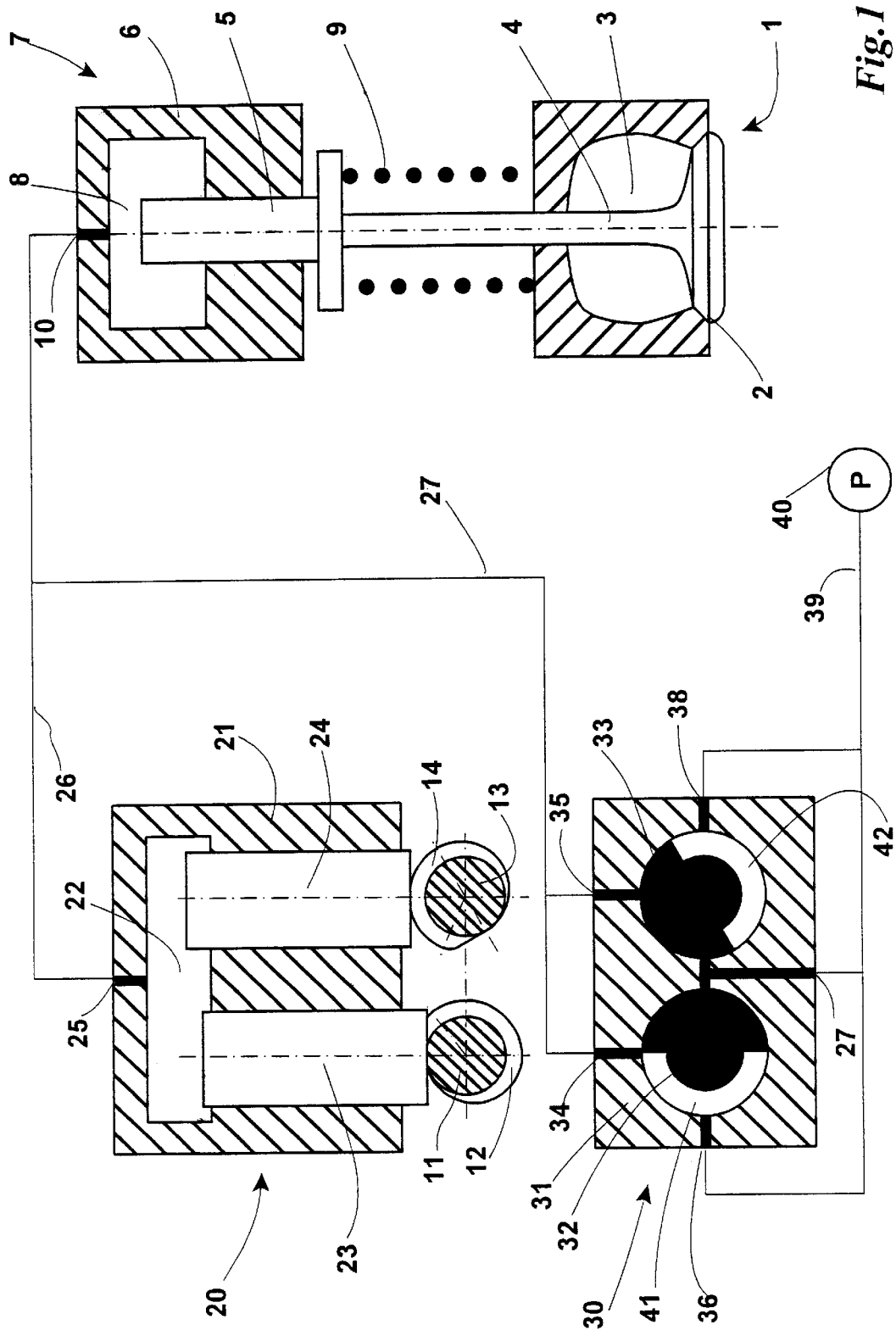
FIG. 1 diagrammatically depicts an exemplary embodiment of a valve mechanism according to the invention for operation of an intake valve of an internal-combustion engine.
Figure 2:
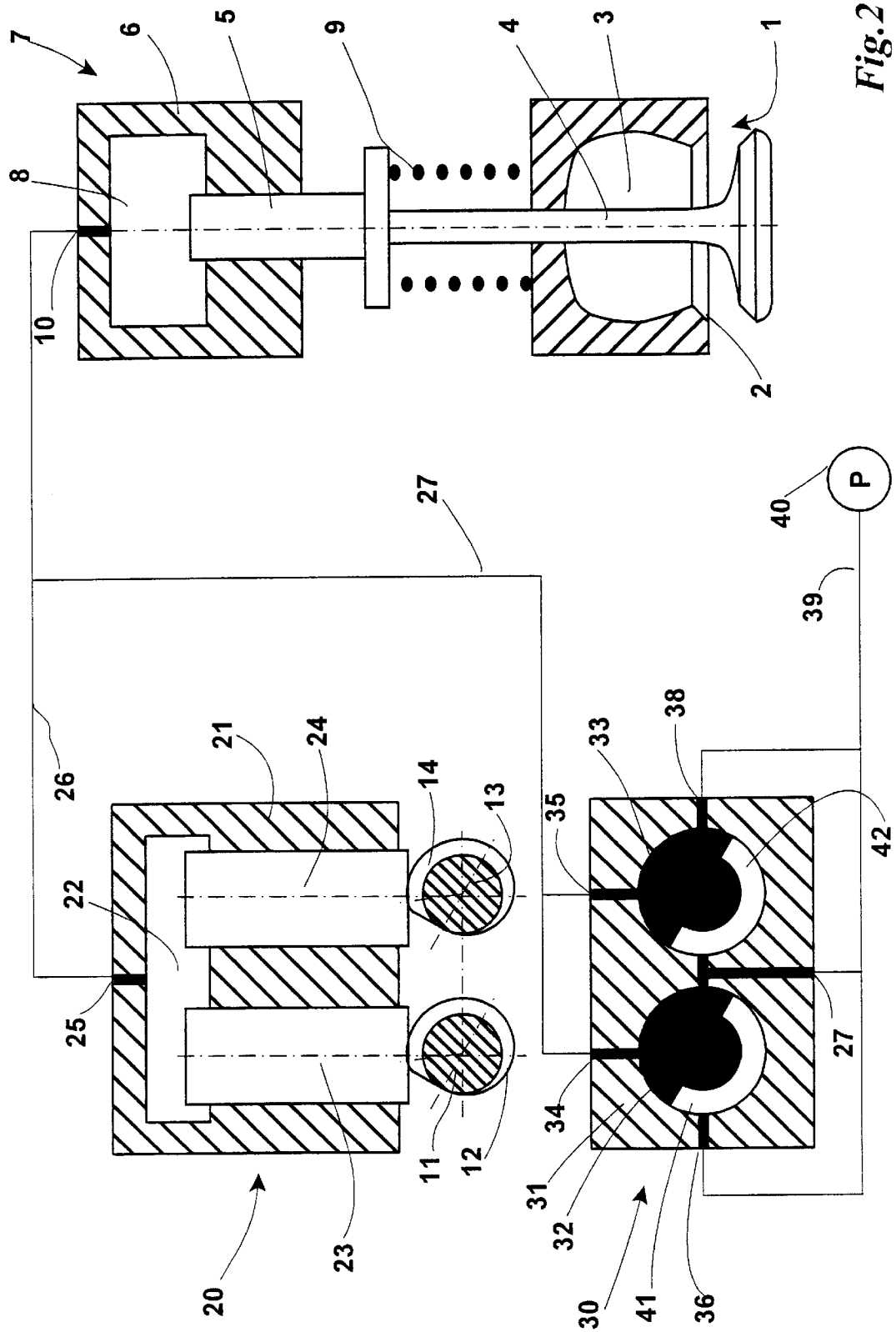
FIG. 2 shows the mechanism from FIG. 1 with the cams in a different position.
Figure 3:
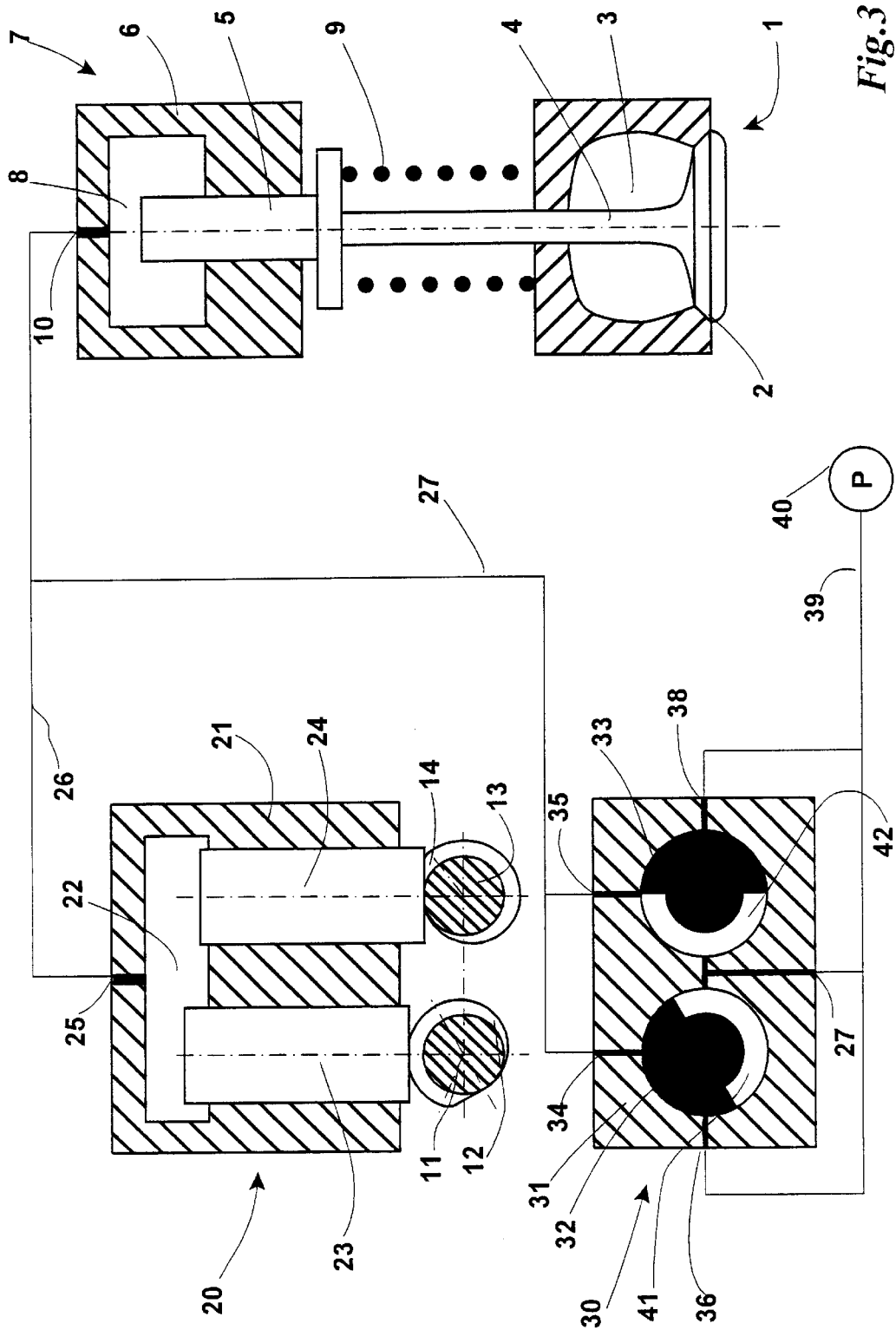
FIG. 3 shows the mechanism from FIG. 1 with the cams in yet another position.

FIGS. 1–3 diagrammatically depict an exemplary embodiment of a mechanism according to the invention for operating a valve of a piston device, in particular a valve 1 of an internal-combustion engine (not shown in more detail). The valve 1 can be moved, in a manner which is to be described in more detail, between an open position and a closed position, the valve 1 bearing against associated valve seat 2 in the closed position and thus closing off the (intake or exhaust) duct 3 of the combustion chamber of the engine. The valve 1 has a valve stem 4 with a piston 5 at the end remote from the valve 1. The piston 5 can move in a reciprocating manner in an associated housing 6 and thus forms a hydraulic valve actuator 7 for operating the valve 1. The piston 5 delimits a variable chamber 8, which chamber has a connection port 10, in such a manner that the valve 1 opens when hydraulic fluid is supplied to the said chamber 8.

To return the valve 1 to the closed position, associated restoring means are provided, in this example a restoring spring 9, although pneumatic restoring means, for example, could also be provided. When the valve 1 is restored to the closed position, hydraulic fluid flows out of the chamber 8 via the port 10.

The valve-operating mechanism is responsible for supplying hydraulic fluid to the chamber 8 and also for discharging hydraulic fluid from the chamber 8. The mechanism allows both the moment at which the valve 1 is opened and closed and the movement of the valve 1 to be varied within a considerable range.

Figure 4:
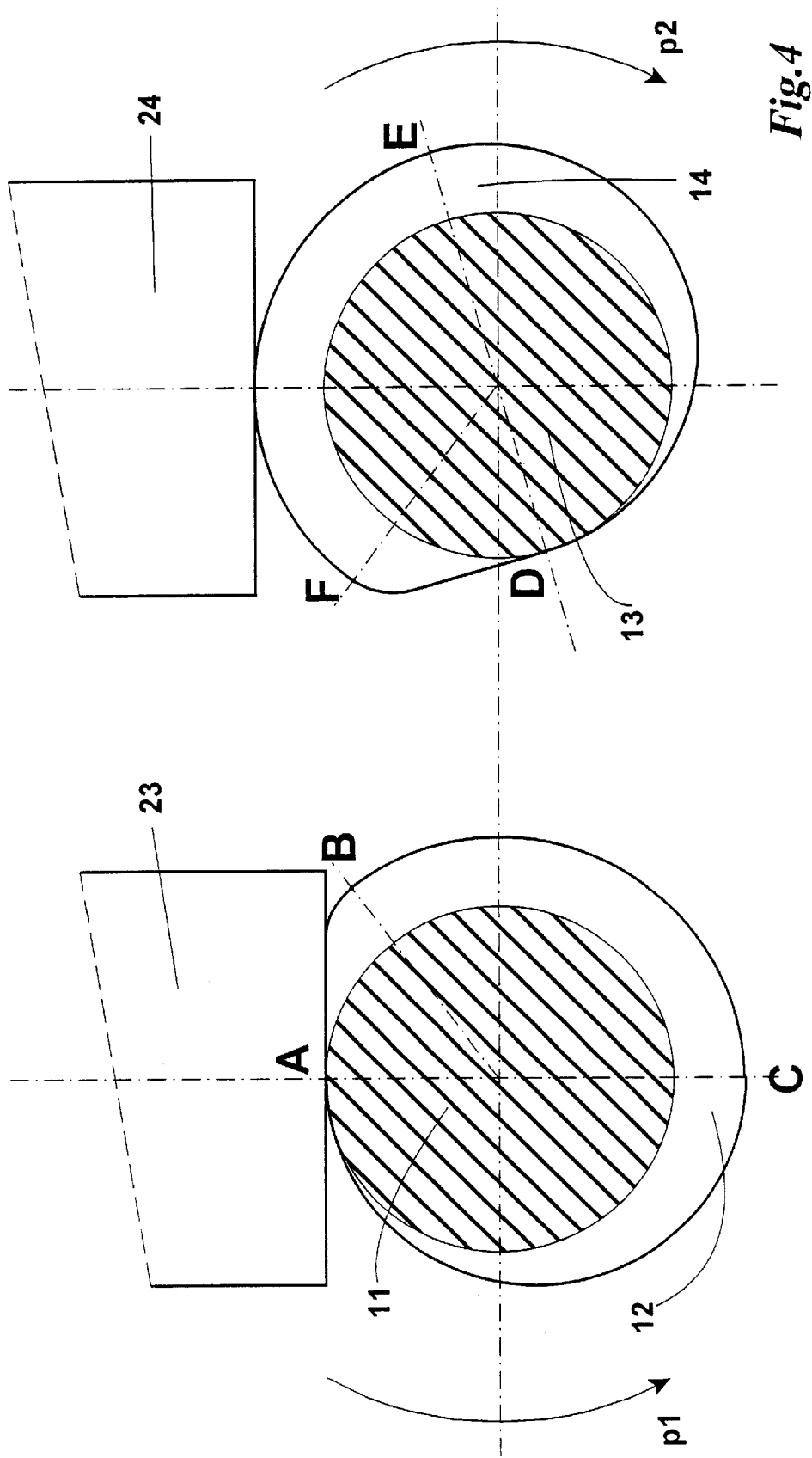
FIG. 4 shows an enlarged view of the cams and the undersides of the plungers of the mechanism from FIG. 1.

As can be seen in particular from FIG. 4, the mechanism comprises a rotatable first camshaft 11, on which there is a first cam 12 with an associated first cam profile, and also a second camshaft 13, on which there is a second cam 14 with an associated second cam profile. The camshafts 11, 13 are in this case parallel to one another and rotate in opposite directions, as indicated by the arrows P1 and P2 in FIG. 4.

The first cam profile of the cam 12 has a rising flank AB, a stationary flank BC and a falling flank CA. In this case, the stationary flank BC is of substantially constant radius with respect to the centre axis of the camshaft 11. Furthermore, rising flank AB is steeper than the falling flank CA.

The second cam profile of the cam 14 has a rising flank DE, a stationary flank EF and a falling flank FD. In this case, the stationary flank EF is of substantially constant radius with respect to the centre axis of the camshaft 13. Furthermore, falling flank FD is steeper than the rising flank DE.

The angular position of the second cam 14 with respect to the crankshaft of the internal-combustion engine can be adjusted by means of an adjustment means (not shown here), and therefore the relative angular position of the first cam 11 and the second cam 14 can be adjusted with respect to one another.

FIGS. 1–3 also show a pressure actuator 20 having a housing 21 in which there is a pressure chamber 22 of variable volume. The actuator 20 also comprises a first plunger 23 and a second plunger 24. The plungers 23 and 24 are each displaceable between a retracted position and an extended position, in such a manner that the position of the first plunger 23 and the second plunger 24 define the volume of the pressure chamber 22. Retraction of one plunger 23, 24 leads to a reduction in the volume of the pressure chamber 22, and extension of one plunger 23, 24 leads to the said volume increasing.

The pressure chamber 22 of the pressure actuator 20 has a single connection port 25 which is connected, via a line 26, to the variable chamber 8 of the valve actuator 7, thus forming a common chamber.

The first plunger 23 in this case bears directly against the cam profile of the first cam 12, and the second plunger 24 bears directly against the cam profile of the second cam 14. If one of the plungers 23, 24 is bearing against the stationary flank of the associated cam, the plunger is also stationary. The rising flank of each cam causes the plunger to retract, while the falling flank causes the plunger to extend.

A branchline 27 is connected to the line 26, which connection forms an opening associated with the common chamber, via which opening hydraulic fluid can flow into and out of the common chamber.

The branchline 27 leads to a valve assembly 30, which is used to open and close the branchline 27.

In this example, the valve assembly 30 has a housing 31 in which there is a first rotatable valve body 32 and a second rotatable valve body 33.

The housing 31 is provided with connections 34, 35 for the branchline 27 and with ports 36,37,38 which are connected to line 39. The line 39 is connected to a hydraulic system 40 (not shown in more detail). The system 40 includes a source for supplying hydraulic fluid under a pressure which is such that this pressure is insufficient to open the valve 1 when this source is connected to the valve actuator 7 via the line 39, the valve assembly 30 and the lines 27,26. In particular, this pressure is even insufficient to overcome the force of the restoring means, in this case the preloading of the spring 9.

The valve bodies 32, 33 each rotate in an associated bore in the housing 31. Each valve body 32, 33 is provided with a recess 41, 42, respectively, the design of which will be explained below. The valve body 32 rotates at the same speed as the camshaft 11 and has a fixed angular position with respect to the said camshaft 11. The valve body 33 rotates at the same speed as the camshaft 13 and has a fixed angular position with respect to the said camshaft 13.

The recesses 41, 42 extend through an arc in the circumference of the valve bodies 32, 33. In this case, the arc of the recess 41 is equal to the arc which is included between the points A and C of the cam profile of cam 12. The recess 42 has an arc which corresponds to the arc between the points E and D of the cam profile of cam 14.

If the plunger 23 interacts with the arc between the points A and C of the cam profile of the cam 12, the valve body 31 closes the connection 34. If the plunger 23 interacts with the arc between C and A, the valve body 31 opens the connection 34 and connects it to the line 39.

If the plunger 24 interacts with the arc between points E and D of the cam profile of the cam 14, the valve body 32 closes the connection 35. If the plunger 24 interacts with the arc between D and E of the cam profile of cam 14, the valve body 33 opens the connection 35 and connects it to the line 39.

If the valve 1 is closed, the line 27 is in open communication with the line 39, whereby a (small) surplus of hydraulic fluid in the chambers 8, 22 (e.g. as a result of thermal expansion of the valve stem 4) can be relieved. On the other hand it is possible to replenish fluid which has leaked from the common chamber along the plungers 23, 24 and the piston 5.

If the piston device is a 4-stroke engine, the camshafts 11, 13 rotate at half the speed of the crankshaft, and if the piston device is a 2-stroke engine, the camshafts 11, 13 rotate at the same speed as the crankshaft.

If the camshafts 11, 13 were not to rotate in opposite directions (as shown), but rather in the same direction, one of the cams 12, 14 would have to be in mirror image form.

FIGS. 1–3 show only a single valve 1 with associated valve actuator 7. It is easily possible, for example in the case of a piston device with a plurality of (intake or exhaust) valves per cylinder, to connect a plurality of valve actuators 7 to the single line 26, which then each operate a valve.

If, for whatever reason, it is nevertheless desired to provide a separate pressure actuator 20 for each valve, it is also conceivable—in the case of a plurality of valves which carry out the same movement—to utilize a single, common valve assembly 30 to which all the lines 27 are connected.

FIG. 4 shows the cams 12, 14 and the plungers 23, 24 on a larger scale than in FIG. 1. In this figure, the position of the cams 12, 14 is identical to that shown in FIG. 1. The plunger 23 is in its fully extended position and the plunger 24 is in its fully retracted position.

Figure 5:
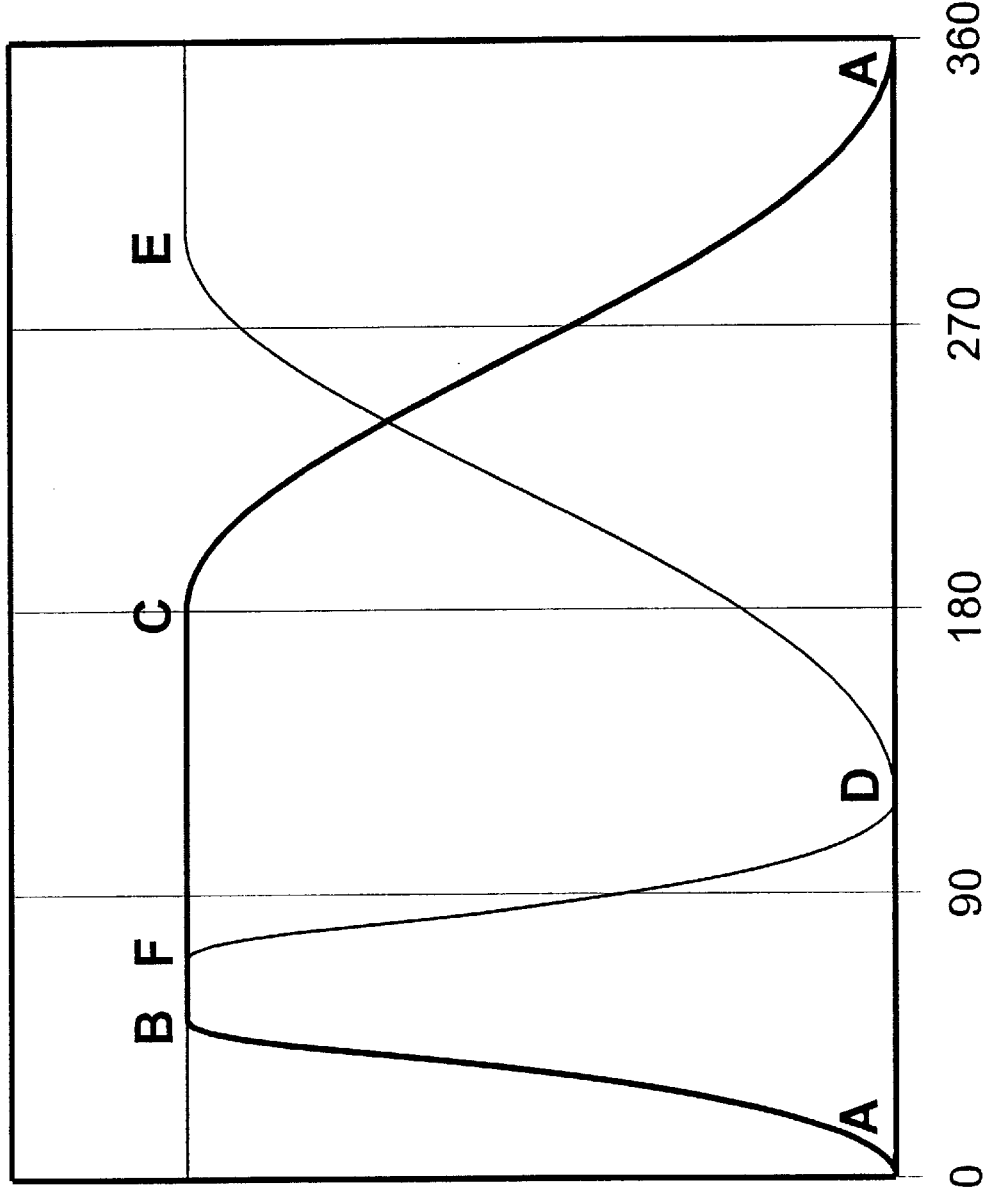
FIG. 5 shows a graph illustrating the opening of the intake valve from FIG. 1, FIGS. 6a–c show examples of virtual cam forms which can be realised using the mechanism shown in FIG. 1.

FIG. 5 uses a graph to show the retraction and extension movements of the plungers 23, 24, starting from the initial position shown in FIG. 4. During this process, the plunger 23 first undergoes a retracting movement, corresponding to points A and B in the graph. The plunger 23 then runs over the stationary flank BC of the cam 12, and the plunger 23 retains its fully retracted position. Finally, the plunger 23 reaches the falling flank CA of the cam 12, and the plunger 23 executes an extending movement.

The plunger 24 is initially in its fully retracted position. When point F is reached, the plunger 24 reaches the steep falling flank FD, and the plunger 24 executes an extending movement. From point D, the plunger 24 undergoes a retracting movement again, until the stationary flank EF is reached at point E.

As stated above, the branchline 27 is in communication with the line 39 if the plunger 23 is interacting with the section CA of the cam 11 and if the plunger 24 is interacting with the section DE of the cam 14. If the branchline 27 is connected to the line 39, this means that it is impossible for the pressure actuator 20 to generate a hydraulic pressure which is sufficient to open the valve 1. After all, the common chamber formed by the pressure actuator 20 and the valve actuator 7 is then connected to a source for supplying hydraulic fluid at such a low pressure that this pressure is insufficient to open the valve 1. Depending on the balance between the pressure in the said source and the pressure prevailing through the pressure actuator, hydraulic fluid will, via the branchline 27 and the valve assembly 30, flow out of the common chamber or flow to the said chamber from the source 40. The valve assembly 30 is closed between the points A and D in FIG. 5.

It follows from the above that the valve lift of the valve 1 is defined by the curve ABFD in FIG. 5. This curve is the resultant of the movement of the two plungers 23, 24. In this case, the cam 12 in fact brings about the opening movement of the valve 1 and the cam 14 controls the closing movement of the valve 1.

FIG. 5 clearly shows that the plunger 24 is in its fully retracted position at the moment at which the other plunger 23 reaches the rising flank AB and thus starts to move from the extended position into the retracted position, resulting in the valve 1 opening. As a result of this measure, it is possible for the valve angle of the valve 1 to be set continuously variably over a wide range while retaining the maximum lift of the valve 1. In practice, in the case of a 2-stroke engine the valve angle can be between approx. 100 and 180 degrees, and in the case of a 4-stroke engine the valve angle can be set between approx. 200 and 360 degrees while retaining the maximum valve lift. Obviously, other values can be achieved with different geometries of the cam profiles.

In the said FIG. 5, a phase shift of the camshaft 13 leads to part FD of the said curve shifting.

A phase shift of the camshaft 11 leads to part AB of the said curve shifting.

In the above text, it has been assumed that the pressure from the source 40 is sufficient to move the plungers 23, 24 to their extended position and to keep them in contact with the associated cam. Should this pressure prove insufficient, it is possible to provide additional restoring means in order to force the plungers 23, 24 into their extended position, for example springs which are positioned in the pressure chamber 22 above each of the plungers 23, 24.

FIG. 1 shows the situation at the moment at which the valve 1 begins to open. Connection 35 is already closed, and connection 34 is on the point of being closed.

In FIG. 2, the valve 1 has reached its maximum lift. The valve assembly 30 holds the two connections 34, 35 closed.

In FIG. 3, the valve 1 has just closed. The connection 34 is still closed off and the valve body 33 is about to connect the connection 35 to the line 39.

It follows from the above that the closing movement of the valve 1 is completely controlled by the variation in the volume of the common chamber as a result of the extension movement of the plunger 24. While the valve 1 is closing, the valve assembly 30 closes off the common chamber from the line 39, so that the closure is at any rate not the result of liquid flowing out of the said common chamber. This is because that could lead the valve 1 moving onto its seat 2 at an undesired speed, which may cause damage.

With regard to the shape of the cams 12, 14, the following can be pointed out:
 the sum of arcs AB and DF should preferably be equal to the smallest possible valve angle,
 the arcs AC and DE are in this case shown as eccentric arcs of a circle, but may also be in other forms,
 the sum of the arcs AB and BC, as well as the sum of the arcs DF and FE should preferably be at least equal to the maximum valve opening angle,
 the profiles and the included arcs of the cam sections AB and FD do not have to be equal,
 the displacement of liquid resulting from the displacement from A to B of cam 23 is preferably equal to the displacement of liquid resulting from the displacement of cam 24 from F to D.

The mechanism described has the further advantage that play between a cam and the valve 1 is always equal to zero, irrespective of any thermal influences and wear.

Figure 6:
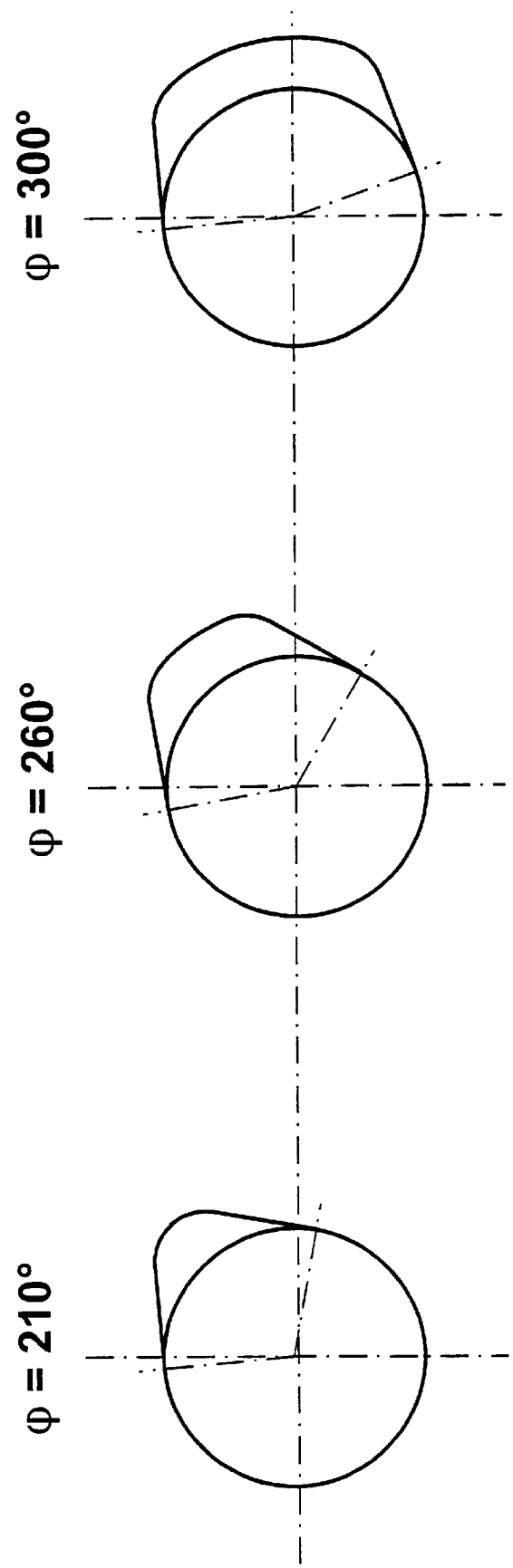

FIGS. 6a–c show three imaginary cam profiles which can be realised using the mechanism described. The imaginary cam profile could then be used, for example, to operate an intake valve of an internal-combustion engine using a single cam, as is in itself customary.

FIG. 6a shows a form of cam which is optimum for creating a high torque at a low speed.

FIG. 6b shows a form of cam which is optimum for creating a relatively high torque at a high speed.

FIG. 6c shows a form of cam which is optimum for a relatively low power at a moderate speed but fully opened throttle. The Miller cycle can be realised with the latter form of cam.

The mechanism as described can also be used to operate a valve of a piston compressor. For example, it is possible to operate an intake valve of a compressor of this type, in which case, in a specific embodiment, the moment at which the intake valve closes is controlled as a function of the capacity control of the compressor.

It is also possible for the mechanism to operate an exhaust valve of a piston compressor, in which case, for example, the time at which the valve opens is controlled as a function of a differential pressure measurement between the pressure in the cylinder and in the pressure line.

FIGS. 7, 8, 9a–c and 10-c show another embodiment of the valve-operating mechanism according to the invention.

Figure 7:
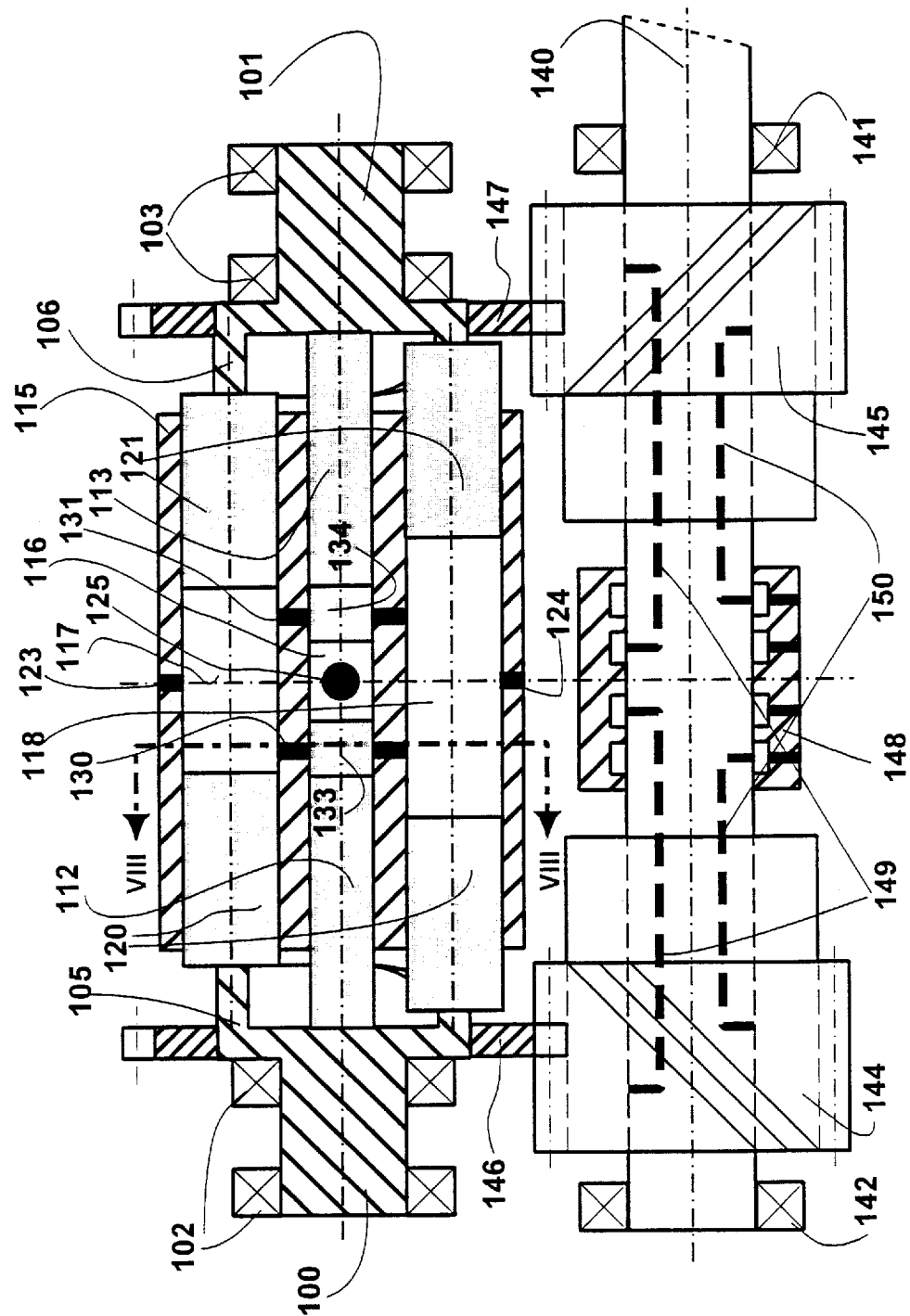
FIG. 7 shows a longitudinal section through another embodiment of the valve-operating mechanism according to the invention.

FIG. 7 shows a first camshaft 100 and a second camshaft 101, which lie in line with one another and are rotatably mounted, by means of bearings 102, 103, in a support which is not shown in more detail.

On each camshaft 100, 101 there is arranged an associated cam 105, 106, respectively. These cams 105, 106 are shown in detail in FIGS. 9 and 10.

The cams 105, 106 are at an axial distance from one another. Each cam 105, 106 is formed as a disk body which extends around the associated camshaft 100, 101 with a cam profile on the side facing towards the other cam, which profile is in this case obtained by profiling the axial end face of a raised annular rim 110, 111, respectively, arranged on the disk body. The cam profile therefore runs in the axial direction, as seen with regard to the camshaft.

FIGS. 9c and 10c respectively show, in developed form, the cam profile of the cam 105 and the cam 106. In these figures, the points A,B,C are indicated for cam 105 and these points have the same meaning as explained above with reference to FIGS. 1–5. Likewise, in the case of cam 106 the points E,D,F have the same meaning as that explained above with reference to FIGS. 1–5.

The camshaft 100 is provided with a central shaft stub 112, which projects towards the other camshaft 101, and the camshaft 101 is in the same way provided with a shaft stub 113.

Between the cams 105 and 106 there is a stationary housing 115. The housing 115 is provided with a central through-bore 116, into which the shaft stubs 112 and 113 fit.

Furthermore, the housing 115 is provided with a plurality of bores distributed around the circumference, which are at a distance from the centre axis of the camshafts 100, 101 and extend between the ends of the housing 115. The distance from the centre of these bores to the centre axis of the camshafts 100, 101 corresponds to the radius of the raised rims 110, 111 of the cams 105, 106. In this example, four bores 117, 118 of this type are provided in the housing 115.

Each of the bores 117, 118 is closed off at its two axial ends by means of a plunger 120, 121, respectively, which can move in a reciprocating manner in the bore, the said plungers bearing against the adjacent cam 105, 106, respectively. Thus, each of these bores 117, 118 together with the associated plungers 120, 121 forms a pressure actuator as explained above with reference to FIGS. 1–5.

The variable pressure chamber which is delimited between two plungers 120, 121 in the bore 117 is in communication, via a connection 123, with a hydraulic valve actuator, for example as shown in FIG. 1. The pressure chamber between the plungers 120, 121 in bore 118 is in communication with another hydraulic valve actuator via connection 124. Since in this case four such pressure actuators are accommodated in the housing 115, the mechanism can be used, for example, to operate the intake valves or exhaust valves of a four-cylinder piston device. Obviously, in a variant it is possible for the housing 115 to be provided with more than four pressure actuators.

The shaft stubs 112, 113 end at a distance from one another and form an intermediate chamber which is provided with a connection 125 to a further source/buffer (not shown) for hydraulic fluid which is under a pressure which is insufficient to open the valves which are to be operated, in the same way as the source 40.

Furthermore, the housing 115 is provided, for each bore 117, 118, with two transverse bores 130, 131 which are at an axial distance from one another. These bores 130, 131 are able to connect the pressure chamber in a bore 117, 118 to the connection 125. Each of the shaft stubs 112, 113 is provided at its end with a valve body 133, 134 which can open or close the transverse bores 130, 131 in a suitable way. In this example, the valve body 133, 134 is in each case formed by an end part, which is provided with a flattened section, of the corresponding shaft stub. Therefore, these valve bodies 133, 134 form the same type of valve assembly as that which has been explained with reference to FIGS. 1–5.

FIG. 7 then shows the way in which the camshafts 100, 101 are driven and the way in which the angular position of each camshaft 100, 101 can be adjusted with respect to the crankshaft (not shown) of the piston device.

In drive terms, the shaft 140 is coupled to the crankshaft of the piston device and is rotatably mounted in bearings 141, 142 parallel to the camshafts 100 and 101. A gearwheel 144 and a gearwheel 145, in this case each with oblique toothing, are arranged on the shaft 140. The gearwheel 144 meshes with gearwheel 146, which is arranged on the camshaft 100, and the gearwheel 145 meshes with gearwheel 147 which is arranged on camshaft 101.

The gearwheels 144 and 145 are not fixed to the shaft 140, but rather can each be adjusted independently of the other in terms of their angular position with respect to the shaft 140. For this purpose, a hydraulic adjustment means is provided for each gearwheel 144, 145. Hydraulic fluid can be supplied in a suitable way to the said adjustment means via a central hydraulic rotary joint 148 and ducts 149, 150 in the shaft 140. In this way, the angular position of each of the cams 105, 106 with respect to the crankshaft of the piston device can be adjusted, and therefore the movements of the valves of the piston device operated by the mechanism can be adjusted, as explained with reference to FIGS. 1–5.

What is claimed is:

1. A mechanism for operating a valve of a piston device, which valve can move between an open position and a closed position and is provided with associated restoring means for returning the valve to the closed position, which mechanism comprises:
a hydraulic valve actuator for operating the valve of the piston device, which valve actuator has a variable chamber which is delimited by a piston which can be coupled to the valve, in such a manner that when hydraulic fluid is supplied to the said chamber the valve opens,
a rotatable first cam with a first cam profile,
a rotatable second cam with a second cam profile, the first cam profile and the second cam profile each comprising a rising flank, a stationary flank and a falling flank,
a first cam follower which can be operated by the first cam,
a second cam follower which can be operated by the second cam, the relative angular position of the first cam and the second cam with respect to one another being adjustable,
a pressure actuator in which there is a pressure chamber having a variable volume and having a first and a second plunger, the first cam follower being coupled to the first plunger and the second cam follower being coupled to the second plunger, in such a manner that a plunger is stationary if the associated cam follower is operated by the stationary flank, the first and second plungers each being displaceable between a retracted position and an extended position, in such a manner that the position of the first and second plungers defines the volume of the pressure chamber, the retraction of a plunger leading to a reduction in the volume of the pressure chamber,
the pressure chamber of the pressure actuator being connected to the variable chamber of the valve actuator to form a common chamber,
the common chamber being provided with a common chamber opening which common chamber opening has an associated valve assembly for opening and closing the common chamber opening,
wherein that the valve assembly associated with the common chamber opening is adapted to open said common chamber opening if the first plunger moves to the extended position or if the second plunger moves to the retracted position, so that hydraulic fluid can flow out of the common chamber, and
wherein if the common chamber opening is open the hydraulic pressure in the common chamber is insufficient to open or hold open the valve operated by the hydraulic valve actuator, and in that the mechanism is designed in such a manner that, at the moment at which the first plunger begins to move out of the extended position into the retracted position, the second plunger is in its retracted position or has almost reached its retracted position, in such a manner that the valve which is operated by the valve actuator opens as a result of the retracting movement of the first plunger;
in which the valve assembly has a housing in which there is a first rotatable valve body and a second rotatable valve body which each rotate in an associated bore in the housing, in which the first valve body rotates at the same speed as the first cam and has a fixed angular position with respect to the said first cam and in which the second valve body rotates at the same speed as the second cam and has a fixed angular position with respect to the said second cam, in which each body is provided with a recess extending through an arc in the circumference of the valve bodies, and in which the housing is provided at each bore with a connection to the common chamber and with ports which are connectable to a hydraulic system, the recesses each having such an extension that said common chamber opening is open during the movement of the first plunger from the retracted position to the extended position and also during the movement of the second plunger from the extended position to the retracted position, so that hydraulic fluid can flow out of the common chamber.

2. A mechanism for operating a valve of a piston device, which valve can move between an open position and a closed position and is provided with associated restoring means for returning the valve to the closed position, which mechanism comprises:

a hydraulic valve actuator for operating the valve of the piston device, which valve actuator has a variable chamber which is delimited by a piston which can be coupled to the valve, in such a manner that when hydraulic fluid is supplied to the said chamber the valve opens, a rotatable first cam with a first cam profile, a rotatable second cm with a second cam profile, the first cam profile and the second cam profile each comprising a rising flank, a stationary flank and a falling flank, a first cam follower which can be operated by the first cam, a second cam follower which can be operated by the second cam, the relative angular position of the first cam and the second cam with respect to one another being adjustable, a pressure actuator in which there is a pressure chamber having a variable volume and having a first and a second plunger, the first cam follower being coupled to the first plunger and the second cam follower being coupled to the second plunger, in such a manner that a plunger is stationary if the associated cam follower is operated by the stationary flank, the first and second plungers each being displaceable between a retracted position and an extended position, in such a manner that the position of the first and second plungers defines the volume of the pressure chamber, the retraction of a plunger leading to a reduction in the volume of the pressure chamber, the pressure chamber of the pressure actuator being connected to the variable chamber of the valve actuator to form a common chamber, the common chamber being provided with a common chamber opening which common chamber opening has an associated valve assembly for opening and closing the common chamber opening, if the common chamber opening is open the hydraulic pressure in the common chamber is insufficient to open or hold open the valve operated by the hydraulic valve actuator, wherein the mechanism is designed in such a manner that, at the moment at which the first plunger begins to move out of the extended position into the retracted position, the second plunger is in its retracted position or has almost reached its retracted position, in such a manner that the valve which is operated by the valve actuator opens as a result of the retracting movement of the first plunger, wherein the valve assembly associated with the common chamber opening opens said common chamber opening during the movement of the first plunger from the retracted position to the extended position and also during the movement of the second plunger from the extended position to the retracted position, so that hydraulic fluid can flow out of the common chamber;

the valve assembly has a housing in which there is a first rotatable valve body and a second rotatable valve body which each rotate in an associated bore in the housing, in which the first valve body rotates at the as the first cam and has a fixed angular position with respect to the said first cam and in which the second valve body rotates at the same speed as the second cam and has a fixed angular position with the said second cam, and in which each body is provided with a recess extending through an arc in the circumference of the valve bodies, and in which the housing is provided at each bore with a connection to the common chamber and with ports which are connectable to a hydraulic system, the recesses each having such an extension that said common chamber opening is open during the movement of the first plunger from the retracted position to the extended position and also during the movement of the second plunger from the extended position to the retracted position, so that hydraulic fluid can flow out of the common chamber.

3. A mechanism according to claim 1 or 2, in which the first and second cam followers are integral with the associated plunger.

4. A mechanism according to claim 1 or 2, in which the opening movement of the valve of the piston device is defined by the rising flank of the first cam, and in which the closing movement of the said valve is defined by the falling flank of the second cam.

5. A mechanism according to claim 1 or 2, in which each cam is a radial cam.

6. A mechanism according to claim 1 or 2, in which each cam is an axial cam.

7. A mechanism according to claim 1 or 2, in which angle-adjustment means are provided for adjusting the angular position of one or both cams with respect to the crankshaft of the piston device.

8. A mechanism according to claim 1 or 2, in which angle-adjustment means are provided for adjusting the angular position of one or both cams with respect to the crankshaft of the piston device, and in which the piston device is an internal-combustion engine and the angle-adjustment means are designed in such a manner that the adjustment of the angular position takes place partly as a function of the engine speed and/or load.

9. A mechanism according to claim 1 or 2, in which angle-adjustment means are provided for adjusting the angular position of one or both cams with respect to the crankshaft of the piston device, and in which the piston device is an internal-combustion engine and the angle-adjustment means are constructed in such a manner that the adjustment of the angular position takes place partly as a function of the engine speed and/or load, and in which the engine is a four-stroke engine and its valve is an intake valve, and in which the angle-adjustment means bring about an adjustment of a closing movement of the intake valve as a function of the speed and/or load.

10. A mechanism according to claim 1 or 2, in which the piston device is an internal-combustion engine with a crankshaft, and in which angle-adjustment means are provided for adjusting the angle of one or both cams with respect to the crankshaft.

11. A mechanism according to claim 1 or 2, in which the piston device is a four-stroke internal-combustion engine which operates by Miller cycle, in which the valve-operating mechanism operates an intake valve, and in which the mechanism id designed to adjust the valve angle of the said valve between 180 and 330 degrees while retaining the valve lift.

12. A mechanism according to claim 1 or 2, in which a closing movement of the valve, is defined exclusively by the falling flank of the second cam, and not by hydraulic fluid flowing out of the common chamber.

13. A mechanism according to claim 1 or 2, in which the axes of rotation of the first and second cams lie in line with one another, the cams each being formed as a body extending around the associated axis, which cams are arranged at an axial distance from one another and each have the cam profile on the side facing towards the other cam, a housing which is provided with the pressure chamber and which movably guides the first and second plungers being situated between the cams.

14. A mechanism according to claim 1 or 2, in which the axes of rotation of the first and second cams lie in line with one another, the cams each being formed as a body extending around the associated axis, which cams are arranged at an axial distance from one another and each have the cam profile on the side facing towards the other cam, a housing which is provided with the pressure chamber and which movably guides the first and second plungers being situated between the cams, and in which the pressure chamber is a bore which is substantially parallel to the axes of the cams, which bore is closed off at each axial end by the first and second plungers, which can move in a reciprocating manner in the bore.

15. A mechanism according to claim 1 or 2, in which the axes of rotation of the first and second cams lie in line with one another, the cams each being formed as a body extending around the associated axis, which cams are arranged at an axial distance from one another and each have the cam profile on the side facing towards the other cam, a housing which is provided with the pressure chamber and which movably guides the first and second plungers being situated between the cams, and in which the piston device comprises a plurality of valves.

16. A mechanism according to claim 1 or 2, wherein the valve of the piston device has a maximum required opening angle and wherein the falling flank of the first cam profile as well as the rising flank of the second cam profile each extend over an arc at least equal to the maximum required opening angle of the valve of the piston device.

17. A mechanism according to claim 1 or 2, wherein the piston device has a crank shaft, and wherein the relative angular positions of the first and second cam are adjustable with respect to the crank shaft.

* * * * *